(12) United States Patent
Lai et al.

(10) Patent No.: US 10,565,381 B2
(45) Date of Patent: Feb. 18, 2020

(54) METHOD AND APPARATUS FOR PERFORMING FIRMWARE PROGRAMMING ON MICROCONTROLLER CHIP, AND ASSOCIATED MICROCONTROLLER CHIP

(71) Applicant: Faraday Technology Corp., Hsin-Chu (TW)

(72) Inventors: Chun-Yuan Lai, Hsin-Chu (TW); Chen-Chun Huang, Hsin-Chu (TW)

(73) Assignee: Faraday Technology Corp., Hsin-Chu (TW)

( * ) Notice: Subject to any disclaimer, the term of this patent is extended or adjusted under 35 U.S.C. 154(b) by 0 days.

(21) Appl. No.: 16/011,650

(22) Filed: Jun. 19, 2018

(65) Prior Publication Data

US 2019/0278912 A1 Sep. 12, 2019

(30) Foreign Application Priority Data

Mar. 6, 2018 (TW) .............................. 107107338 A

(51) Int. Cl.
*G06F 21/57* (2013.01)
*G06F 21/60* (2013.01)
(Continued)

(52) U.S. Cl.
CPC .............. *G06F 21/572* (2013.01); *G06F 8/30* (2013.01); *G06F 8/65* (2013.01); *G06F 8/71* (2013.01);
(Continued)

(58) Field of Classification Search
CPC ... G06F 8/30; G06F 8/65; G06F 8/654; G06F 8/71; G06F 9/4416; G06F 9/445;
(Continued)

(56) References Cited

U.S. PATENT DOCUMENTS

2005/0180572 A1 8/2005 Graunke
2007/0165264 A1 7/2007 Minami
(Continued)

FOREIGN PATENT DOCUMENTS

CN 105468935 A 4/2016
TW 201333702 A1 8/2013
TW 201337629 A 9/2013

*Primary Examiner* — Wei Y Zhen
*Assistant Examiner* — Mohammed N Huda
(74) *Attorney, Agent, or Firm* — Winston Hsu

(57) ABSTRACT

A method and apparatus for performing firmware programming on a microcontroller chip and the associated microcontroller chip are provided. The method includes: utilizing an integrated circuit (IC) programmer to generate a seed file including characteristic information of the IC programmer; utilizing an encoder to encrypt original data representing a program code at least according to the characteristic information, to generate an encryption version of the original data; utilizing the IC programmer to decrypt the encryption version of the original data according to the characteristic information, to generate the original data utilizing the IC programmer to encrypt the original data at least according to predetermined information, to generate another encryption version of the original data; utilizing the microcontroller chip to decrypt the other encryption version at least according to predetermined information stored in the microcontroller chip to generate the original data, and write the original data into a non-volatile (NV) memory.

15 Claims, 5 Drawing Sheets

(51) Int. Cl.
*G06F 21/73* (2013.01)
*G06F 21/76* (2013.01)
*G06F 8/30* (2018.01)
*G06F 8/65* (2018.01)
*G06F 8/71* (2018.01)

(52) U.S. Cl.
CPC ............ *G06F 21/602* (2013.01); *G06F 21/73* (2013.01); *G06F 21/76* (2013.01)

(58) Field of Classification Search
CPC .... G06F 12/1408; G06F 21/31; G06F 21/572; G06F 21/575; G06F 21/602; G06F 21/72; G06F 21/76; H04L 9/0827; H04L 9/0838; H04L 9/0877; H04L 9/0891; H04L 9/304; H04L 9/3226; H04L 9/3278; H04L 67/34
USPC ........................................................ 717/168
See application file for complete search history.

(56) References Cited

U.S. PATENT DOCUMENTS

2013/0163764 A1* 6/2013 van den Berg et al. ..................... G06F 21/572
380/278
2017/0083724 A1* 3/2017 Chhabra et al. ........ G06F 21/72

* cited by examiner

METHOD AND APPARATUS FOR PERFORMING FIRMWARE PROGRAMMING ON MICROCONTROLLER CHIP, AND ASSOCIATED MICROCONTROLLER CHIP

BACKGROUND OF THE INVENTION

1. Field of the Invention

The present invention relates to chip protection, more particularly, to method and apparatus for performing firmware programming on a microcontroller chip, and associated microcontroller chip.

2. Description of the Prior Art

Microcontroller (MCU) chips may be applied to electronic products, and various program codes respectively running on the MCU chips may make the electronic products be equipped with corresponding functions. For example, a manufacturer of an electronic product may delegate a solution provider to develop a program code for executing on MCU chips. After finishing the design of the program code, the solution provider may release the program code to a third party (such as a programming service provider) to perform integrated circuit (IC) programming, where the programming service provider may be an original equipment manufacturer (OEM). After finishing the task of programming, the programming service provider may deliver the MCU chip to the manufacturer for performing the production of the electronic product. In the ideal situation, the solution provider may obtain non-recurring engineering (NRE), or charge royalties according to the yield of the electronic product. However, some problems such as rights infringement may occur. For example, the programming service provider may program more number of MCU chips than that in the agreement to evade the royalties, even resale the program code to competitors of the manufacturer. Thus, there is a need for a novel architecture to improve protection mechanisms associated with the program code.

SUMMARY OF THE INVENTION

An objective of the present invention is to provide a method and apparatus for performing firmware programming on a microcontroller chip, and associated microcontroller chip, to solve the aforementioned problems.

Another objective of the present invention is to provide a method and apparatus for performing firmware programming on a microcontroller chip, and associated microcontroller chip, to improve protection of program codes.

At least one embodiment of the present invention provides a method for performing firmware programming on a microcontroller chip, and the method may comprise: utilizing an integrated circuit (IC) programmer to generate a seed file, wherein the seed file comprises characteristic information of the IC programmer, and the characteristic information corresponds to the IC programmer; utilizing an encoder to encrypt original data representing a program code at least according to the characteristic information, to generate an encryption version of the original data; utilizing the IC programmer to decrypt the encryption version of the original data according to the characteristic information, to generate the original data; utilizing the IC programmer to encrypt the original data at least according to predetermined information stored in the IC programmer, to generate another encryption version of the original data, wherein the predetermined information is also stored in the microcontroller chip; and utilizing the microcontroller chip to decrypt the another encryption version of the original data at least according to the predetermined information stored in the microcontroller chip, to generate the original data, and write the original data into a non-volatile (NV) memory within the microcontroller chip.

At least one embodiment of the present invention provides an apparatus for performing firmware programming on a microcontroller chip, the apparatus comprises an encoder, and the encoder may be arranged to perform encoding. An IC programmer may generate a seed file, the seed file may comprise characteristic information of the IC programmer, and the characteristic information corresponds to the IC programmer. In addition, the encoder may comprise a data processing circuit, and the data processing circuit may be arranged to perform data processing for the encoder, wherein the data processing circuit encrypts original data representing a program code at least according to the characteristic information, to generate an encryption version of the original data. Additionally, the IC programmer may decrypt the encryption version of the original data according to the characteristic information, to generate the original data. The IC programmer may encrypt the original data at least according to predetermined information stored in the IC programmer, to generate another encryption version of the original data, wherein the predetermined information is also stored in the microcontroller chip. The microcontroller chip may decrypt the another encryption version of the original data at least according to the predetermined information stored in the microcontroller chip, to generate the original data, and writes the original data into a NV memory within the microcontroller chip.

At least one embodiment of the present invention provides an apparatus for performing firmware programming on a microcontroller chip, and the apparatus may comprise an IC programmer, which may be arranged to perform programming. The IC programmer may comprise a data processing circuit, and the data processing circuit may be arranged to generate a seed file, wherein the seed file may comprise characteristic information of the IC programmer, and the characteristic information may correspond to the IC programmer. In addition, an encoder may encrypt original data representing a program code at least according to the characteristic information, to generate an encryption version of the original data. Additionally, the data processing circuit may decrypt the encryption version of the original data according to the characteristic information, to generate the original data. The data processing circuit may encrypt the original data at least according to predetermined information stored in the IC programmer, to generate another encryption version of the original data, wherein the predetermined information is also stored in the microcontroller chip. The microcontroller chip may decrypt the another encryption version of the original data at least according to the predetermined information stored in the microcontroller chip, to generate the original data, and writes the original data into a NV memory within the microcontroller chip.

The method, apparatus, and microcontroller chip of the present invention may solve the related art problems without introducing any side effect or in a way that is less likely to introduce a side effect. Compared to the related art, the method, apparatus, and microcontroller chip of the present invention can avoid various rights infringements associated with the program codes.

These and other objectives of the present invention will no doubt become obvious to those of ordinary skill in the art after reading the following detailed description of the preferred embodiment that is illustrated in the various figures and drawings.

DETAILED DESCRIPTION

One or more embodiments of the present invention provide a method and apparatus for performing firmware programming on a microcontroller (MCU) chip, and associated MCU chip. The method may be applied to a programming system, and the apparatus may comprise at least one portion (e.g. a portion or all) of the programming system. Based on the method and the apparatus, program codes can be properly protected. More particularly, the present invention can prevent multiple types of attacks (such as reverse engineering or playback attack) to avoid any rights infringement. For better comprehension, the MCU chip may comprise at least one die, and the aforementioned at least one die may comprise one or more dies (such as a single die comprising a microcontroller and a non-volatile (NV) memory, or die stacking formed with a die comprising the microcontroller and a die comprising the NV memory), but the present invention is not limited thereto. According to some embodiment, the MCU chip may further comprise a package of the aforementioned at least one die.

Figure 1:
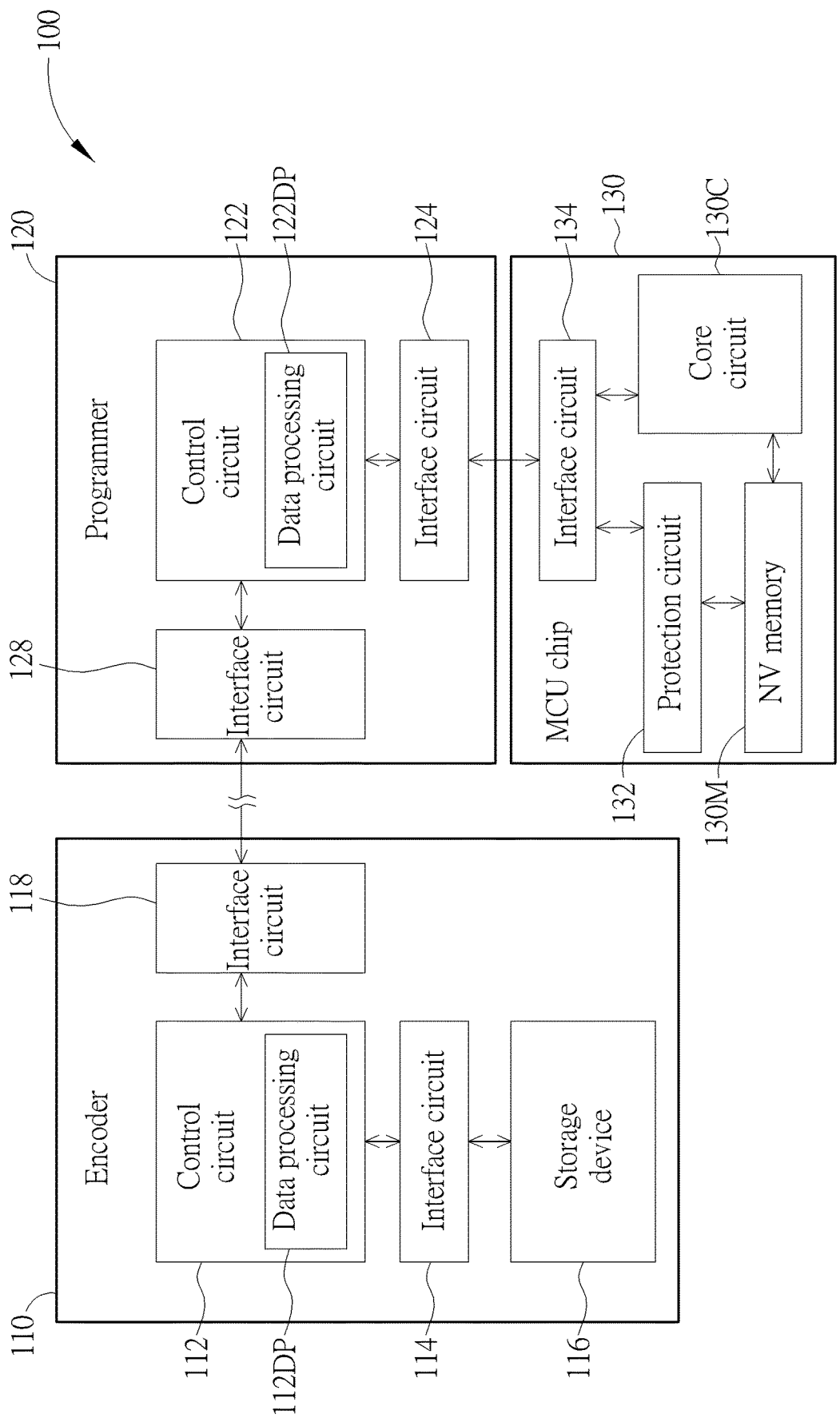
FIG. 1 is a diagram illustrating a programming system according to an embodiment of the present invention.

FIG. 1 is a diagram illustrating a programming system 100 according to an embodiment of the present invention, where the programming system 100 may be taken as an example of the aforementioned programming system. The programming system 100 may comprise an encoder 110, an integrated circuit (IC) programmer such as a programmer 120, and an MCU chip 130. The encoder 110 may comprise a control circuit 112, interface circuits 114 and 118, and a storage device 116, where the control circuit 112 may comprise a data processing circuit 112DP; the programmer 120 may comprise a control circuit 122 and interface circuits 124 and 128, where the control circuit 122 may comprise a data processing circuit 122DP; and the MCU chip 130 may comprise a core circuit 130C, a NV memory 130M, a protection circuit 132 and an interface circuit 134, where the core circuit 130C and the NV memory 130M may be taken as examples of the microcontroller and the aforementioned NV memory, respectively; but the present invention is not limited thereto. The control circuits 112 and 122 may be arranged to control the encoder 110 and the programmer 120, respectively, and the data processing circuits 112DP and 122DP may be arranged to perform data processing for the encoder 110 and the programmer 120, respectively. The control circuit 112 may be implemented in various ways. For example, the control circuit 112 may comprise a processor and associated circuits (such as a random access memory (RAM), a control chipset, a bus, etc.), and the data processing circuit 112DP may represent this processor executing a control program corresponding to the method. For another example, the control circuit 112 may be an application-specific integrated circuit (ASIC), and the data processing circuit 112DP may represent a sub-circuit corresponding to the method within this ASIC. For another example, the control circuit 112 may be a microcontroller, and the data processing circuit 112DP may represent this microcontroller executing a control program corresponding to the method. In addition, the control circuit 122 may be implemented in various ways. For example, the control circuit 122 may comprise a processor and associated circuit (such as a RAM, a control chipset, a bus, etc.), and the data processing circuit 122DP may represent this processor executing a control program corresponding to the method. For another example, the control circuit 122 may be an ASIC, and the data processing circuit 122DP may represent a sub-circuit corresponding to the method within this ASIC. For another example, the control circuit 122 may be a microcontroller, and the data processing circuit 122DP may represent this microcontroller executing a control program corresponding to the method.

According to this embodiment, the storage device 116 may be arranged to store information (such as the program code expected to be programmed to the MCU chip 130), but the present invention is not limited thereto. According to some embodiments, the storage device 116 may be replaced with an external storage device. Examples of the storage device 116 may include, but are not limited to: a NV memory (e.g. a flash memory or other types of memories); where the interface circuit 114 may be an associated communication interface circuit, to allow the control circuit 112 to access the storage device 116. In addition, the interface circuits 118 and 128 may conform to the same communication specification, such as any of the existing communication specifications (e.g. the Universal Serial Bus (USB) specification, the Inter-Integrated Circuit (I2C) bus specification, etc.), to allow the encoder 110 and the programmer 120 to communicate with each other to exchange information, or exchange information through extra device, indirectly, but the present invention is not limited thereto. The interface circuits 124 and 134 may conform to the same communication specification, such as any of the existing communication specifications (e.g. the Joint Test Action Group (JTAG) specification, the Serial Wire Debug (SWD) specification, etc.), to allow the programmer 120 and the MCU chip 130 to communicate with each other to exchange information. The NV memory 130M may be arranged to store information (such as the data representing the program code). The protection circuit 132 may protect the program code according to the method, and may be arranged to perform data processing, to allow firmware programming to be performed on the MCU chip 130. For example, in a normal situation (e.g. the programming service provider performs programming tasks under authorization of the manufacturer), the protection circuit 132 may allow the programmer 120 to program the program code to the MCU chip 130, to make the program code be stored in the NV memory 130M; and in an abnormal situation (e.g. someone performs the programming tasks without the authorization of the manufacturer), the protection circuit 132 may prohibit the program code from being programmed to the MCU chip 130; but the present invention is not limited thereto. In a situation where the MCU chip 130 is replaced with a conventional MCU chip, as the protection circuit 132 does not exist in the conventional MCU chip, the programmer 120 may protect the program code according to the method, to prevent the program code from being programmed to the conventional MCU chip. Additionally, after the program code is programmed to the MCU chip 130, the manufacturer may obtain the MCU chip (with the programming being completed) for manufacturing an electronic product. After finishing the production of the electronic product, when the electronic product is turned on, the core circuit 130C may read the program code. Under control of the core circuit 130C executing the program code, the MCU chip 130 may control the operations of the electronic product.

According to some embodiments, the programmer 120 may comprise a storage device, which may be arranged to store information (such as encoded data of the program code), but the present invention is not limited thereto. Examples of the storage device may include, but are not limited to: the NV memory (e.g. a flash memory or other types of memories).

Figure 2:
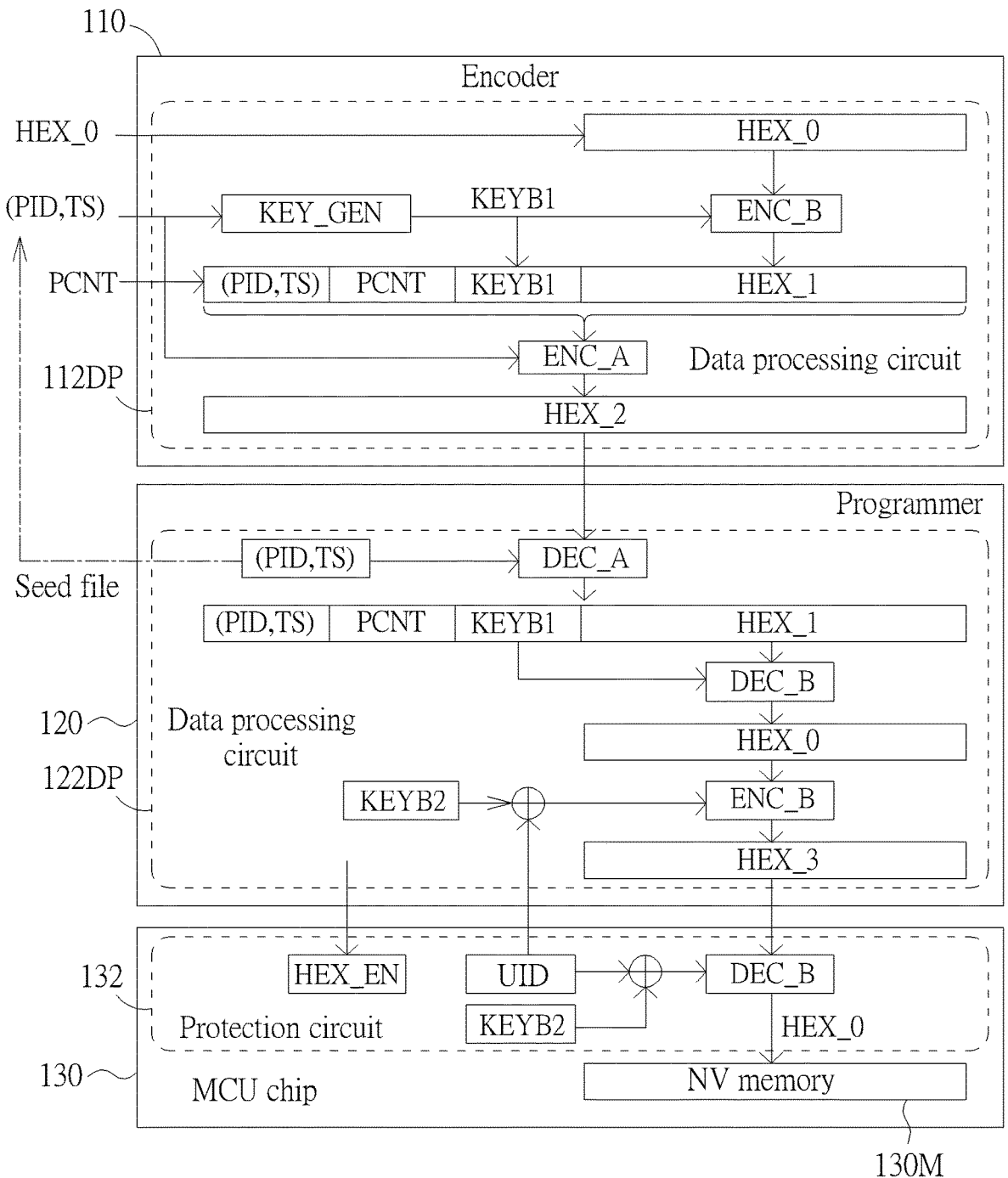
FIG. 2 is a control scheme of a method for performing firmware programming on a microcontroller chip according to an embodiment of the present invention.

FIG. 2 is a control scheme of the method (the aforementioned method for performing firmware programming on the microcontroller chip) according to an embodiment of the present invention. For example, the data processing circuit 112DP may comprise multiple data processing sub-circuits and multiple storage circuits (e.g. registers, buffers, or any of other types of storage circuits); the data processing circuit 122DP may comprise multiple data processing sub-circuits and multiple storage circuits (e.g. registers, buffers, or any of other types of storage circuits); and the protection circuit 132 may comprise multiple data processing sub-circuits and multiple storage circuits (e.g. registers, buffers, or any of other types of storage circuits); but the present invention is not limited thereto. In FIG. 2, a key generator KEY_GEN, encoding circuits ENC_A and ENC_B, and decoding circuits DEC_A and DEC_B may be regarded as examples of these data processing sub-circuits, and associated information may be generated, input, output, and/or transmitted in this architecture, and may be temporarily stored in one or more storage circuits within these storage circuits. The aforementioned associated information may comprise: data {HEX_0, HEX_1, HEX_2, HEX_3, . . . }, a predetermined number PCNT, programmer identification (ID) PID, a timestamp TS, unique ID UID, and keys KEYB1 and KEYB2, where the key KEYB2 may be a private key, and the programmer ID PID, the timestamp TS, the unique ID UID and the key KEYB2 may be regarded as intrinsic values; but the present invention is not limited thereto. The data HEX_0 may represent the program code expected to be programmed to the MCU chip 130, and the data {HEX_1, HEX_2, HEX_3} may represent various encryption versions of the data HEX_0. For example, the data HEX_1 may represent an encryption version of the data HEX_0, the data HEX_2 may represent an encryption version of a combination data {(PID, TS), PCNT, KEYB1, HEX_1} of the programmer ID PID, the timestamp TS, the predetermined number PCNT, the key KEYB1 and the data HEX_1, the data HEX_3 may represent another encryption version of the data HEX_0.

According to this embodiment, no matter whether the encoder 110 and the programmer 120 are located in the same place or different places, and no matter whether the encoder 110 and the programmer 120 are held by the same person or different people, the programming system 100 may operate according to the method. For better comprehension, provided that the encoder 110 and the programmer 120 are located in different places, and the encoder 110 and the programmer 120 are held by different people, but the present invention is not limited thereto. The programmer ID PID may be stored in the programmer 120 (e.g. the programmer ID PID may be stored in the NV memory within the programmer 120). People with the authorization (such as people of the solution provider) may set the programmer ID PID in the programmer 120 in advance, and then provide the programmer 120 to the programming service provider. When needed to perform the programming tasks, a holder (such as person of the programming service provider) of the programmer 120 may operate the programmer 120 to obtain a seed file from the programmer 120, but cannot known the programmer ID PID and the timestamp TS from the seed file. For example, the data processing circuit 112DP may be built in a predetermined encryption procedure, and the seed file has been encrypted through the predetermined encryption procedure. The data processing circuit 112DP may generate the seed file according to the programmer ID PID and the timestamp TS, for further use of the encoder 110, and store this set of the programmer ID PID and the timestamp TS into the NV memory within the programmer 120. As the timestamp may correspond to time (e.g. timestamps are typically different from each other), multiple seed files generated at different time points may be different from each other. The holder (such as person of the solution provider) of the encoder 110 may obtain the programmer ID PID and the timestamp TS from the seed file, for example, utilize a predetermined decryption procedure corresponding to the predetermined encryption procedure to decrypt the seed file, to input the programmer ID PID and the timestamp TS into the encoder 110, and input the predetermined number PCNT and the data HEX_0 (such as the program code expected to be programmed to the MCU chip 130) into the encoder 110.

In the encoder 110: the key generator KEY_GEN may generate the key KEYB1 according to the combination data (PID, TS) of the programmer ID PID and the timestamp TS; the encoding circuit ENC_B may encrypt the data HEX_0 according to the key KEYB1, to generate the data HEX_1; and the encoding circuit ENC_A may encrypt the combination data {(PID, TS), PCNT, KEYB1, HEX_1} (which may be temporarily stored in the storage circuit) according to the combination data (PID, TS), to generate the data HEX_2; where the data HEX_0, the combination data {(PID, TS), PCNT, KEYB1, HEX_1} and the data HEX_2 may be temporarily stored in the multiple storage circuits of the data processing circuit 112DP. The holder of the encoder 110 (such as person of the solution provider) may provide the data HEX_2 to the holder of the programmer 120 (such as person of the programming service provider). In addition, in the programmer 120: the decoding circuit DEC_A may decrypt the data HEX_2 according to this set of programmer ID PID and the timestamp TS (which are stored in advance), to generate the combination data {(PID, TS), PCNT, KEYB1, HEX_1}; the decoding circuit DEC_B may decrypt the data HEX_1 according to the key KEYB1, to generate the data HEX_0; the data processing circuit 122DP may obtain the unique ID UID from the MCU chip 130, and a data processing circuit such as a combination circuit (that may be represented by a small circle labeled the symbol "+") may combine the key KEYB2 and the unique ID UID, to generate the combination data {KEYB2, UID}; and the encoding circuit ENC_B may encrypt the data HEX_0 according to the combination data {KEYB2, UID}, to generate the data HEX_3, and transmit the data HEX_3 and data HEX EN to the MCU chip 130; where the combination data {(PID, TS), PCNT, KEYB1, HEX_1}, the data HEX_0, the combination data {KEYB2, UID} and the data HEX_3 may be temporarily stored in the multiple storage circuits of the data processing circuit 122DP, and the key KEYB2 may be stored in the programmer 120 in advance, for example, stored in the NV memory within the programmer 120, but the present invention is not limited thereto. Additionally, in the MCU chip 130: a data processing sub-circuit within the protection circuit 132, such as the combination circuit (that may be represented by a small circle labeled the symbol "+"), may combine the key KEYB2 and the unique ID UID, to generate the combination data {KEYB2, UID}; and the decoding circuit DEC_B may decrypt the data HEX_3 according to the combination data {KEYB2, UID}, to generate the data HEX_0; where the key KEYB2 and the unique ID UID may be stored in the MCU chip 130 in advance, for example, be stored in a certain NV memory within the MCU chip 130 (e.g. the NV memory 130M, or another NV memory), and the combination data {KEYB2, UID} may be temporarily stored in a storage circuit within the protection circuit 132.

For example, the data HEX EN may represent enabling information, for enabling programming function of the MCU chip 130, which means: in a situation without the enabling information, the programming function of the MCU chip 130 will be disabled. In addition, the predetermined number PCNT may be arranged to control and manage the number of multiple MCU chips {130} (such as the MCU chip 130) that is predetermined to be programmed in the programming tasks, and may be determined along with authorization of each time. The data processing circuit 122DP may count the number of times of programming, for example, perform counting down of the remained number of times, more particularly, starting from the predetermined number PCNT, reduce the remaining number of times by one for every programming. When the remaining number of times is equal to zero, the holder of the programmer 120 (such as person of the programming service provider) will not be able to utilize the programmer 120 to perform any extra programming task. Thus, the method and apparatus of the present invention can avoid rights infringements.

Figure 3:
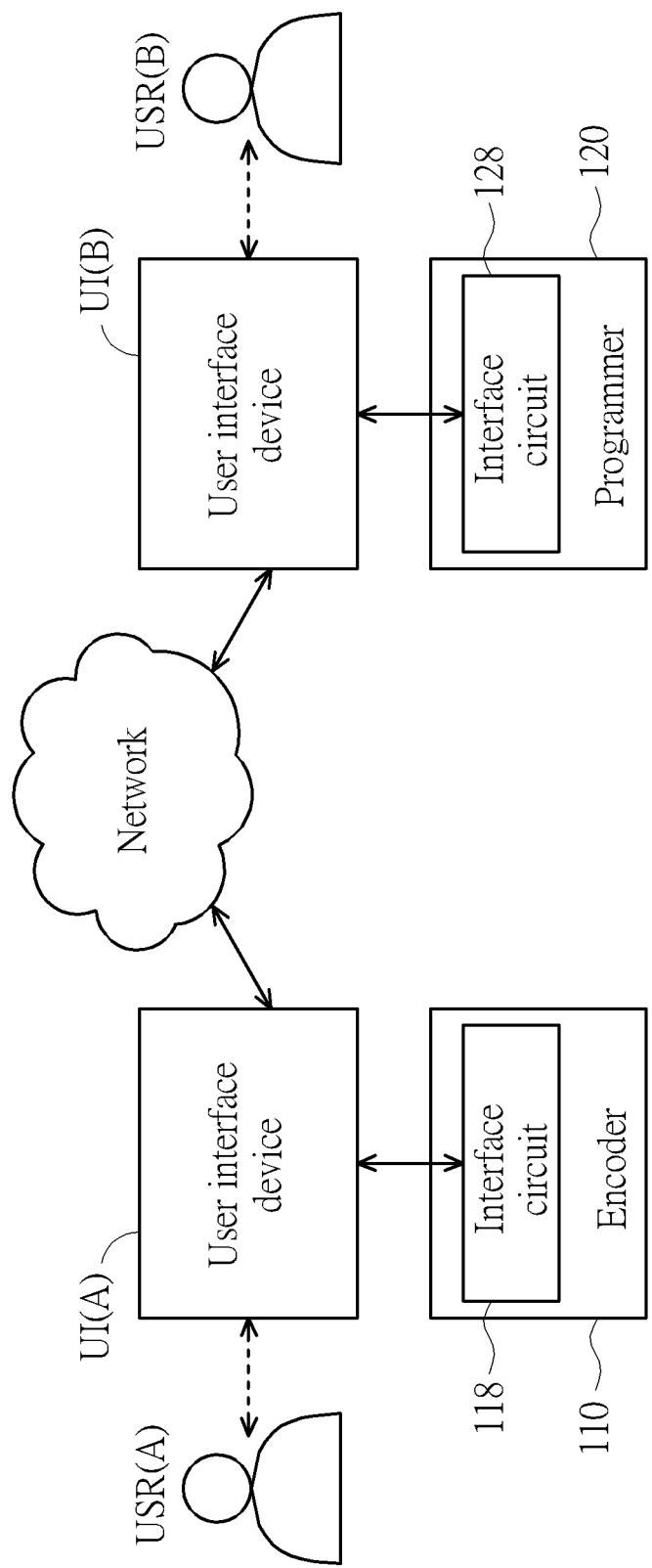
FIG. 3 illustrates implementing details of the programming system shown in FIG. 1 according to an embodiment of the present invention.

FIG. 3 illustrates implementing details of the programming system 100 shown in FIG. 1 according to an embodiment of the present invention. User interface devices UI(A) and UI(B) may be arranged to provide user interface, to allow users USR (A) and USR(B) to operate the encoder 110 and the programmer 120, respectively. Examples of any of the user interface devices UI(A) and UI(B) may include, but are not limited to: a personal computer (e.g. a desktop computer or a laptop computer), a tablet and a multifunctional mobile phone. For better comprehension, the interface circuit 118 within the encoder 110 and the interface circuit 128 within the programmer 120 may conform to the USB specification, and may be coupled to the user interface devices UI (A) and UI (B) through respective USB ports (of the encoder 110 and the programmer 120), respectively; and the encoder 110 and the programmer 120 may provide control pages with web page style, respectively, to allow the users USR(A) and USR(B) to control the encoder 110 and the programmer 120 through browsers executing on the user interface devices UI(A) and UI(B), respectively, to perform a series of operations of firmware programming, such as the operations described in the control scheme shown in FIG. 2; but the present invention is not limited thereto. The user interface devices UI(A) and UI (B) may perform communications with each other through at least one network (e.g. one or more networks). For example, the user USR(B) may utilize the user interface device UI (B) to transmit the seed file to the user interface device UI (A) through the Internet. For another example, the user USR(A) may utilize the user interface device UI (A) to transmit the data HEX_2 to the user interface device UI (B) through the Internet. For brevity, similar descriptions for this embodiment are not repeated in detail here.

Figure 4:
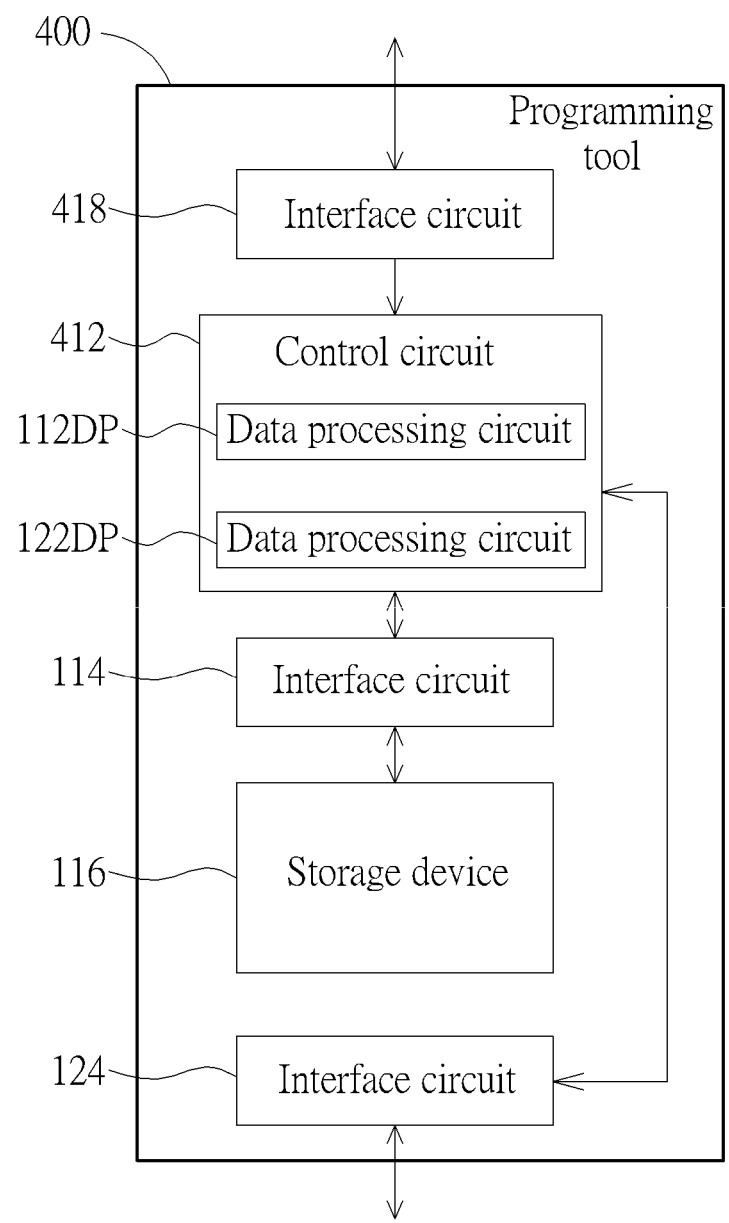
FIG. 4 is a diagram illustrating a programming tool according to an embodiment of the present invention.

FIG. 4 is a diagram illustrating a programming tool 400 according to an embodiment of the present invention. The programming tool 400 may be taken as an example of the apparatus (the aforementioned apparatus for performing firmware programming on the microcontroller chip). The control circuits 112 and 122 may be integrated into the same control circuit, such as a control circuit 412, where the control circuit 412 may comprise the data processing circuit 112DP and 122DP. In addition, the interface circuits 118 and 128 may be integrated into the same interface circuit, such as an interface circuit 418. For example, the interface circuit 418 may conform to the USB specification, and may be coupled to a user interface device (such as one of the user interface devices UI(A) and UI (B)) through the USB port of the programming tool 400, but the present invention is not limited thereto. Person with authorization (such as person of the solution provider, or person of the manufacturer) may set the programming tool 400 in advance, to enable one of the data processing circuits 112DP and 122DP, and more particularly, further disable another one of the data processing circuits 112DP and 122DP. When the data processing circuit 112DP is enabled and the data processing circuit 122DP is disabled, the programming tool 400 may be utilized as the encoder 110. When the data processing circuit 122DP is enabled and the data processing circuit 112DP is disabled, the programming tool 400 may be utilized as the programmer 120. For brevity, similar descriptions for this embodiment are not repeated in detail here.

According to some embodiments, the apparatus may comprise the encoder 110 within the programming system 100. More particularly, the apparatus may comprise another IC programmer, and the another IC programmer is an equivalent circuit of the IC programmer (such as the programmer 120) within the programming system 100. For example, the apparatus may comprise the programming tool 400, where the data processing circuit 112DP is enabled, and the data processing circuit 122DP is disabled. For brevity, similar descriptions for these embodiments are not repeated in detail here.

According to some embodiments, the apparatus may comprise the IC programmer (such as the programmer 120) within the programming system 100. More particularly, the apparatus may comprise another encoder, and the another encoder is an equivalent circuit of the encoder 110 within the programming system 100. For example, the apparatus may comprise the programming tool 400, where the data processing circuit 122DP is enabled, and the data processing circuit 112DP is disabled. For brevity, similar descriptions for these embodiments are not repeated in detail here.

Figure 5:
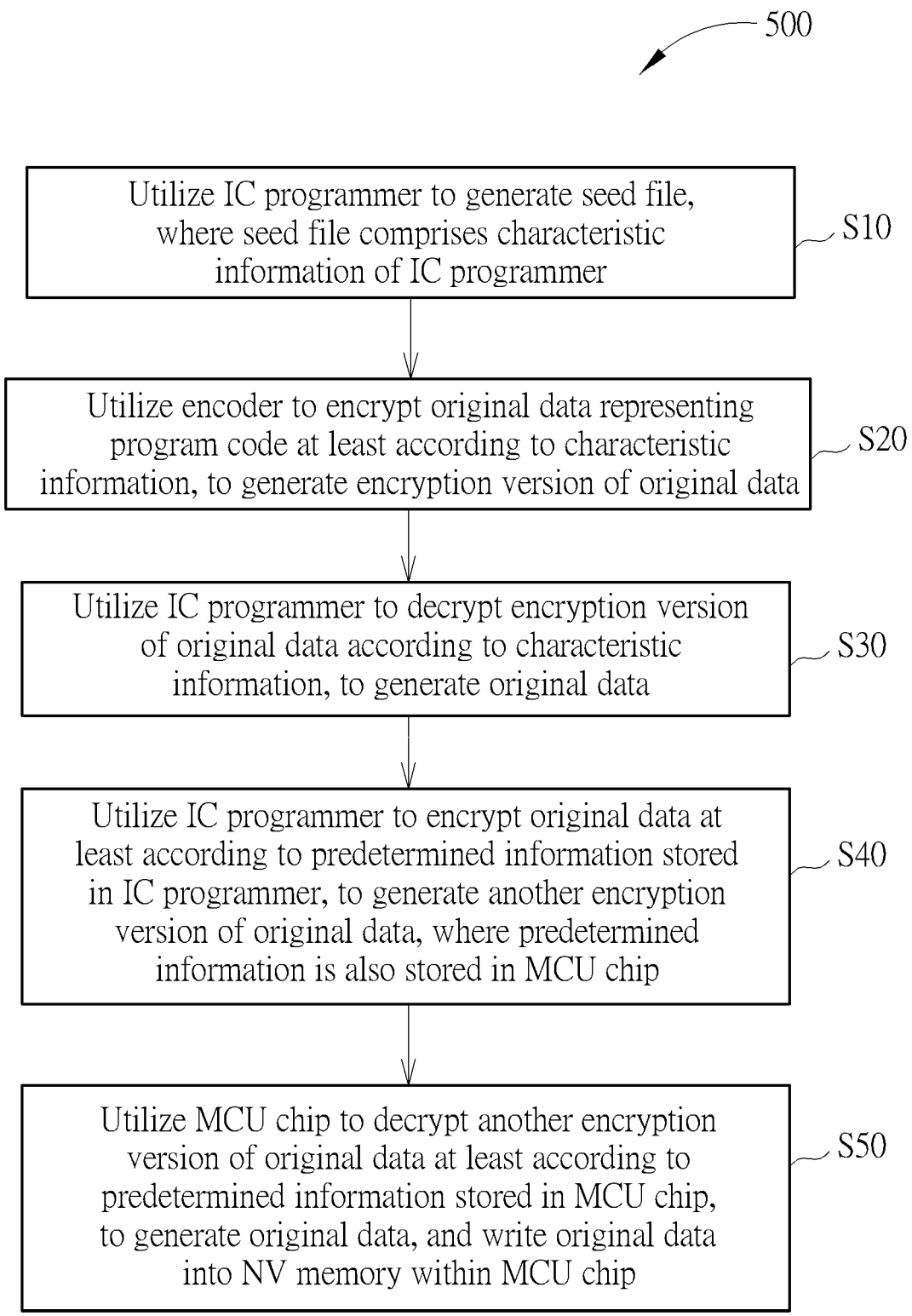
FIG. 5 illustrates a workflow of the method.

FIG. 5 illustrates a workflow 500 of the method.

In Step S10, utilize the IC programmer such as the programmer 120 (e.g. the data processing circuit 122DP therein), to generate the seed file, where the seed file comprises characteristic information of the IC programmer, for example, the characteristic corresponds to the IC programmer. According to this embodiment, the characteristic information may comprise the programmer ID PID of the IC programmer. More particularly, the characteristic information may further comprise the timestamp TS, for example, the timestamp TS may correspond to the time at which the seed file is generated, but the present invention is not limited thereto.

In step S20, utilize the encoder 110 (e.g. the data processing circuit 112DP therein) to encrypt original data (such as the data HEX_0) representing the program code at least according to the characteristic information, to generate an encryption version (such as the data HEX_2) of the original data.

In step S30, utilize the IC programmer such as the programmer 120 (e.g. the data processing circuit 122DP therein), to decrypt the encryption version of the original data according to the characteristic information, to generate the original data.

In step S40, utilize the IC programmer such as the programmer 120 (e.g. the data processing circuit 122DP therein), to encrypt the original data at least according to predetermined information stored in the IC programmer, to generate another encryption version (such as the data HEX_3) of the original data, where the predetermined information is also stored in the MCU chip 130. According to this embodiment, the predetermined information may comprise the key KEYB2. For example, the key KEYB2 may be a private key.

In step S50, utilize the MCU chip 130 (e.g. the protection circuit 132 therein, such as the data processing sub-circuit of the protection circuit 132) to decrypt the another encryption version of the original data at least according to the predetermined information stored in the MCU chip 130, to generate the original data, and write the original data into the NV memory 130M within the MCU chip 130.

According to this embodiment, in Step S20, the data processing circuit 112DP within the encoder 110 may encrypt the original data (such as the data HEX_0) according to the characteristic information and the predetermined number PCNT, to generate the encryption version (such as the data HEX_2) of the original data, where the predetermined number PCNT may represent the number of the multiple MCU chips {130}, to allow the IC programmer to perform firmware programming on the multiple MCU chips {130}. For example, the data processing circuit 112DP may generate the key KEYB1 according to the characteristic information, and encrypt the original data (such as the data HEX_0) according to the key KEYB1, to generate an intermediate encryption version (such as the data HEX_1) of the original data; and, the data processing circuit 112DP may encrypt the combination data (such as the combination data {(PID, TS), PCNT, KEYB1, HEX_1}) comprising the characteristic information, the predetermined number PCNT, the key KEYB1 and the intermediate encryption version according to the characteristic information, to generate the encryption version (such as the data HEX_2) of the original data.

In addition, the unique ID UID of the MCU chip 130 is stored in the MCU chip 130. In step S40, the data processing circuit 122DP within the programmer 120 may encrypt the original data according to the combination data (such as the combination data {KEYB2, UID}) comprising the unique ID and the predetermined information, to generate the another encryption version of the original data. For example: the data processing circuit 122DP may receive the unique ID from the MCU chip 130; and the data processing circuit 122DP may combine the unique ID and the predetermined information, to generate this combination data (such as the combination data {KEYB2, UID}) for encrypting the original data. Additionally, decrypting the another encryption version of the original data to generate the original data may be performed by utilizing the protection circuit 132 within the MCU chip 130. With the aid of correspondence between decryption of the protection circuit 132 and encryption of the IC programmer (such as the programmer 120), the method can prevent the MCU chip 130 from being replaced with another MCU chip, where the another MCU chip lacks any equivalent circuit of the protection circuit 132. For brevity, similar descriptions for this embodiment are not repeated in detail here.

According to some embodiments, the encoder 110 may be implemented as a personal computer (e.g. a desktop computer or a laptop computer), where the interface circuits 118 and 128 may be the communication interface circuits conforming to existing communication specifications, but the present invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing firmware programming on a microcontroller chip, the method comprising:
   utilizing an integrated circuit (IC) programmer to generate a seed file, wherein the seed file comprises characteristic information of the IC programmer, and the characteristic information corresponds to the IC programmer;
   utilizing an encoder to encrypt original data representing a program code at least according to the characteristic information, to generate an encryption version of the original data;
   utilizing the IC programmer to decrypt the encryption version of the original data according to the characteristic information, to generate the original data;
   utilizing the IC programmer to encrypt the original data at least according to predetermined information stored in the IC programmer, to generate another encryption version of the original data, wherein the predetermined information is also stored in the microcontroller chip; and
   utilizing the microcontroller chip to decrypt the another encryption version of the original data at least according to the predetermined information stored in the microcontroller chip, to generate the original data, and write the original data into a non-volatile (NV) memory within the microcontroller chip,
   wherein the characteristic information comprises programmer identification (ID) of the IC programmer,
   wherein the step of utilizing the encoder to encrypt the original data representing the program code at least according to the characteristic information to generate the encryption version of the original data further comprises:
      utilizing a data processing circuit of the encoder to encrypt the original data according to the characteristic information and a predetermined number, to generate the encryption version of the original data, wherein the predetermined number represents a number of multiple microcontroller chips, to allow the IC programmer to perform the firmware programming related to the program code on the multiple microcontroller chips;
      utilizing the data processing circuit of the encoder to generate a key according to the characteristic information, and encrypt the original data according to the key, to generate an intermediate encryption version of the original data; and
      utilizing the data processing circuit of the encoder to encrypt combination data comprising the characteristic information, the predetermined number, the key and the intermediate encryption version according to the characteristic information, to generate the encryption version of the original data.

2. The method of claim 1, wherein the characteristic information further comprises a timestamp.

3. The method of claim 2, wherein the timestamp corresponds to the time at which the seed file is generated.

4. The method of claim 1, wherein the predetermined information comprises a key.

5. The method of claim 4, wherein the key utilized by the IC programmer is a private key.

6. The method of claim 1, wherein unique identification (ID) of the microcontroller chip is stored in the microcontroller chip; and the step of utilizing the IC programmer to encrypt the original data at least according to the predetermined information stored in the IC programmer to generate the another encryption version of the original data further comprises:
utilizing a data processing circuit of the IC programmer to encrypt the original data according to combination data comprising the unique ID and the predetermined information, to generate the another encryption version of the original data.

7. The method of claim 6, wherein the step of utilizing the IC programmer to encrypt the original data at least according to the predetermined information stored in the IC programmer to generate the another encryption version of the original data further comprises:
utilizing the data processing circuit of the IC programmer to receive the unique ID from the microcontroller chip; and
utilizing the data processing circuit of the IC programmer to combine the unique ID and the predetermined information, to generate the combination data, for encrypting the original data.

8. The method of claim 1, wherein decrypting the another encryption version of the original data to generate the original data is performed by utilizing a protection circuit within the microcontroller chip; and the method further comprising:
with aid of correspondence between decryption of the protection circuit and encryption of the IC programmer, preventing the microcontroller chip from being replaced with another microcontroller chip, wherein the another microcontroller chip lacks any equivalent circuit of the protection circuit.

9. An apparatus for performing firmware programming on a microcontroller chip, the apparatus comprising:
an encoder, arranged to perform encoding, wherein an integrated circuit (IC) programmer generates a seed file, the seed file comprises characteristic information of the IC programmer, the characteristic information corresponds to the IC programmer, and the encoder comprises:
a data processing circuit, arranged to perform data processing for the encoder, wherein the data processing circuit encrypts original data representing a program code at least according to the characteristic information, to generate an encryption version of the original data;
wherein the IC programmer decrypts the encryption version of the original data according to the characteristic information, to generate the original data;
the IC programmer encrypts the original data at least according to predetermined information stored in the IC programmer, to generate another encryption version of the original data, wherein the predetermined information is also stored in the microcontroller chip; and
the microcontroller chip decrypts the another encryption version of the original data at least according to the predetermined information stored in the microcontroller chip, to generate the original data, and writes the original data into a non-volatile (NV) memory within the microcontroller chip,
wherein the characteristic information comprises programmer identification (ID) of the IC programmer,
wherein the data processing circuit encrypts the original data according to the characteristic information and a predetermined number, to generate the encryption version of the original data, wherein the predetermined number represents a number of multiple microcontroller chips, to allow the IC programmer to perform the firmware programming related to the program code on the multiple microcontroller chips,
wherein the data processing circuit generates a key according to the characteristic information, and encrypts the original data according to the key, to generate an intermediate encryption version of the original data; and the data processing circuit encrypts combination data comprising the characteristic information, the predetermined number, the key and the intermediate encryption version according to the characteristic information, to generate the encryption version of the original data.

10. The apparatus of claim 9, wherein the apparatus comprises another IC programmer, and the another IC programmer is an equivalent circuit of the IC programmer.

11. An apparatus for performing firmware programming on a microcontroller chip, the apparatus comprising:
an integrated circuit (IC) programmer, arranged to perform programming, wherein the IC programmer comprises:
a data processing circuit, arranged to generate a seed file, wherein the seed file comprises characteristic information of the IC programmer, the characteristic information corresponds to the IC programmer, and an encoder encrypts original data representing a program code at least according to the characteristic information, to generate an encryption version of the original data, wherein:
the data processing circuit decrypts the encryption version of the original data according to the characteristic information, to generate the original data; and
the data processing circuit encrypts the original data at least according to predetermined information stored in the IC programmer, to generate another encryption version of the original data, wherein the predetermined information is also stored in the microcontroller chip;
wherein the microcontroller chip decrypts the another encryption version of the original data at least according to the predetermined information stored in the microcontroller chip, to generate the original data, and writes the original data into a non-volatile (NV) memory within the microcontroller chip,
wherein the characteristic information comprises programmer identification (ID) of the IC programmer,
wherein the encoder encrypts the original data according to the characteristic information and a predetermined number, to generate the encryption version of the original data, where the predetermined number represents a number of multiple microcontroller chips, to allow the IC programmer to perform the firmware programming related to the program code on the multiple microcontroller chips, wherein the encoder generates a key according to the characteristic information, and encrypts the original data according to the key, to generate an intermediate encryption version of the original data; and the encoder encrypts combination data comprising the characteristic information, the predetermined number, the key and the intermediate encryption version according to the characteristic information, to generate the encryption version of the original data.

12. The apparatus of claim 11, wherein unique identification (ID) of the microcontroller chip is stored in the microcontroller chip; and the data processing circuit encrypts the original data according to combination data comprising the unique ID and the predetermined information, to generate the another encryption version of the original data.

13. The apparatus of claim 12, the data processing circuit receives the unique ID from the microcontroller chip; and the data processing circuit combines the unique ID and the predetermined information, to generate the combination data, for encrypting the original data.

14. The apparatus of claim 11, wherein the apparatus comprises another encoder, and the another encoder is an equivalent circuit of the encoder.

15. A microcontroller chip, comprising:
 a non-volatile (NV) memory, arranged to store information; and
 a protection circuit, coupled to the NV memory, arranged to perform data processing, to allow firmware programming to be performed on the microcontroller chip, wherein:
  an integrated circuit (IC) programmer generates a seed file, wherein the seed file comprises characteristic information of the IC programmer, the characteristic information corresponds to the IC programmer, and the characteristic information comprises programmer identification (ID) of the IC programmer;
  an encoder encrypts original data representing a program code at least according to the characteristic information, to generate an encryption version of the original data;
  the IC programmer decrypts the encryption version of the original data according to the characteristic information, to generate the original data;
  the IC programmer encrypts the original data at least according to predetermined information stored in the IC programmer, to generate another encryption version of the original data, wherein the predetermined information is also stored in the microcontroller chip; and
  the protection circuit decrypts the another encryption version of the original data at least according to the predetermined information stored in the microcontroller chip, to generate the original data, and writes the original data into the NV memory,
 wherein the encoder encrypts the original data according to the characteristic information and a predetermined number, to generate the encryption version of the original data, where the predetermined number represents a number of multiple microcontroller chips, to allow the IC programmer to perform the firmware programming related to the program code on the multiple microcontroller chips,
 wherein the encoder generates a key according to the characteristic information, and encrypts the original data according to the key, to generate an intermediate encryption version of the original data; and the encoder encrypts combination data comprising the characteristic information, the predetermined number, the key and the intermediate encryption version according to the characteristic information, to generate the encryption version of the original data.

* * * * *